United States Patent [19]

Ficken

[11] Patent Number: 4,804,599
[45] Date of Patent: Feb. 14, 1989

[54] OPTICAL SENSITIZING DYES

[75] Inventor: Geoffrey E. Ficken, Wilmslow, England

[73] Assignee: Ciba-Geigy AG, Basle, Sweden

[21] Appl. No.: 203,524

[22] Filed: May 24, 1988

Related U.S. Application Data

[63] Continuation of Ser. No. 53,511, May 15, 1987, abandoned, which is a continuation of Ser. No. 881,151, Jul. 2, 1986, abandoned, which is a continuation of Ser. No. 762,982, Aug. 6, 1985, abandoned.

[30] Foreign Application Priority Data

Aug. 9, 1984 [GB] United Kingdom ............... 8420201

[51] Int. Cl.$^4$ .................................. G03C 1/10
[52] U.S. Cl. ............................. 430/2; 430/1; 430/591; 430/592; 430/594; 430/595; 430/568; 430/948
[58] Field of Search ............... 430/591, 592, 594, 595, 430/1, 2, 568, 948

[56] References Cited

U.S. PATENT DOCUMENTS 4,025,345  5/1977  Kido et al. ........................... 430/1
4,210,715  7/1980  Fujiwhara et al. ................. 430/568
4,493,889  1/1985  Mihara et al. ....................... 430/572

FOREIGN PATENT DOCUMENTS 595784  12/1947  United Kingdom .

*Primary Examiner*—Won H. Louie
*Attorney, Agent, or Firm*—Wenderoth, Lind & Ponack

[57] ABSTRACT

Dyes of the formula

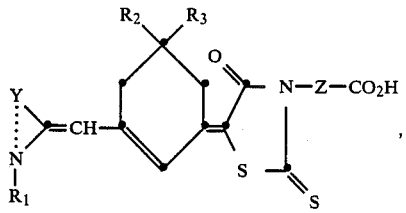

wherein Y completes a benzothiazole or benzoselenazole nucleus, $R_1$ is alkyl, $R_2$ and $R_3$ are hydrogen, alkyl or phenyl and Z is alkylene, are suitable for sensitizing fine grain silver halide emulsions.

13 Claims, No Drawings

OPTICAL SENSITIZING DYES

This application is a continuation of now abandoned application Ser. No. 053,511 filed May 15, 1987, which is a continuation of now abandoned application Ser. No. 881,151 filed July 2, 1986, which is a continuation of now abandoned application Ser. No. 762,982 filed Aug. 6, 1985.

This invention relates to optical sensitizing dyes. In the years immediately before the war and after the war up to the early 1960's a very large number of patents were published relating to novel optical sensitizing dyes for photographic silver halide emulsions. Many millions of compounds were covered in these patent specifications but in practice only a handful were ever used in commercial photographic materials.

In more recent years fewer patent specifications relating to novel sensitizing dyes have appeared and mostly these relate to dyes for special photographic materials rather than to general purpose dyes. Many of the dyes described in patent specifications published 30 or so years ago relate to old fashioned dyes with a broad spectral absorption range and use of such dyes in modern photographic materials would appear to be unlikely.

One such patent specification, BP No. 595,784, which was published in 1947 relates to such old fashioned dyes none of which to the best of our knowledge was ever used. However, we have found that derivatives of one of the dyes described in BP No. 595,784 are of special use for optically sensitizing very fine grain silver halide emulsions which now find use for example as Lippmann emulsions in holographic material.

It is difficult to find dyes which can be used as optical sensitizers in holographic material because (a) The dyes have to provide high sensitivity at the wavelength at which the laser emits light. For example a pulsed ruby laser emits light at 694 nm.

(b) Sufficient dye has to be adsorbed onto the very small silver halide crystals without causing a dye filter effect in which the dye is in equilibrium with the gelatin, but is not adsorbed on the silver halide crystals. It is a fine balance to achieve sufficient adsorbtion on the surface of the silver halide crystals to render the silver halide crystals sufficiently light sensitive without having to add excess dye to achieve this adsorbtion because excess dye tends to decrease sensitivity because of its light filtering effect. This ability to be adsorbed onto the silver halide crystals depends to some extent on the solubility of the dye, but also depends to an unknown and unforeseeable extent on the actual structure of the dye.

(c) The last factor is that even if an optical sensitizing dye fulfils the requirements of (a) and (b) then holographic material sensitized with the dye has to be able to produce a holographic image after a holographic exposure and processing. A number of dyes were tested which fulfilled requirements to (a) and (b) but which could not be used to sensitize holographic material because no useful holographic image was visible on reconstruction after a holographic exposure and processing. By no useful holographic image is meant that a holographic image having a diffraction efficiency of less than 10% was obtained. It is not known why that some dyes which appear on the face of it to be suitable for use in holographic material cannot in fact be used because no useful holographic image is obtained. However, in holographic material the unexposed residual silver halide plays a part, in fact a big part, in the formation of the holographic image and it is thought that the dyes which produce no useful holographic image interfere in some way with the processing of the holographically exposed material. In what way they interfere is not clear and it is not possible to predict if a given dye will interfere.

Thus as can be seen it is difficult to discover dyes which are of use in holographic material and further it is impossible to predict from the behaviour of a dye when used to sensitize camera film emulsion if this dye can be used usefully in holographic material.

Thus it was surprising to us that the dyes which are derivatives of the dyes described in BP No. 595,784 were of use in silver halide holographic material.

Therefore it is an object of the present invention to provide an optical sensitizing dye of the general formula

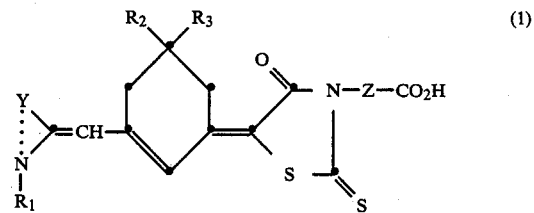

(1)

where Y completes a benzothiazole or benzoselenazole nucleus, the benzene ring of which is optionally substituted, $R_1$ is an alkyl group having 1 to 4 carbon atoms, $R_2$ and $R_3$ are independently from each other hydrogen, an alkyl group having 1 to 4 carbon atoms or phenyl and Z is an alkylene chain $-(CH_2)_n-$ where n is 1 to 4, the alkylene chain being optionally substituted, but $R_1$ is not ethyl if Z is methylene or ethylene.

Preferably $R_1$ is methyl or ethyl, and $R_2$ and $R_3$ are each methyl.

The optional substitution on the benzene ring of the benzothiazole or benzoselenazole ring is preferably selected from at least one alkyl or alkoxy group having from 1 to 4 carbon atoms and a halogen atom. Very useful substituents are (one or more) methyl or methoxy groups or chlorine atoms.

Optional substitution on the alkylene chain Z preferably is selected from an alkyl group having from 1 to 4 carbon atoms, preferably a butyl radical such as $-CH_2CH(CH_3)_2$, an aryl group, preferably phenyl and an aralkyl group wherein the alkyl moiety has from 1 to 4 carbon atoms such as benzyl, phenylethyl, phenylpropyl and phenylbutyl. Preferably, these groups are substituents on a methylene group Z.

The dyes of BP No. 595,784 from which those dyes are derived could not be used as optical sensitizers in holographic material because they were not soluble enough to enable sufficient dye to be adsorbed onto the silver halide crystals.

The dyes of formula (1) are best prepared by the following route:

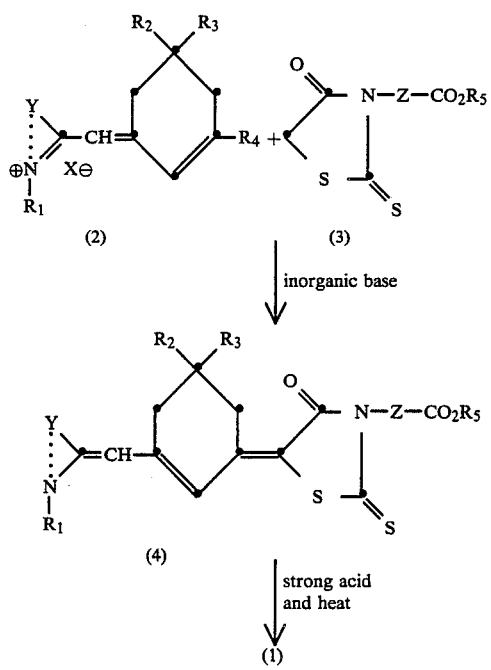

The first stage of the above synthesis is carried out in the presence of a basic condensing agent, preferably an inorganic base, e.g. an alkali carbonate or bicarbonate such as $NaHCO_3$. The second stage is carried out by heating with an aqueous solution of a strong acid, e.g. hydrochloric acid.

In the above formula, $R_4$ is a halogen atom, preferably bromine or chlorine, an alkoxy group ($-OR_6$), or an alkylthio group ($-SR_7$), where $R_6$ and $R_7$ are each alkyl groups having 1 to 4 carbon atoms and $R_5$ is an alkyl group having 1 to 4 carbon atoms.

Alternatively, but less satisfactorily, the dyes of the formula (1) may be prepared directly by reacting a compound of the formula (2) with a compound of the formula (5)

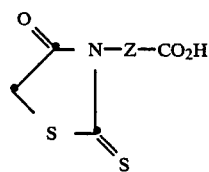

According to another object of the present invention there is provided a Lippmann silver halide emulsion wherein the average grain size is from 0.02 to 0.2 μm and wherein the silver halide grains have been optically sensitized with a dye of the general formula

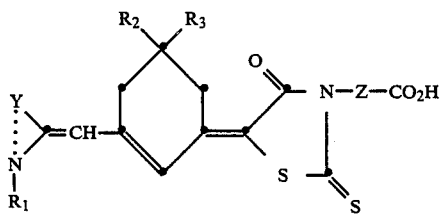

where Y completes a benzothiazole or benzoselenazole nucleus, the benzene ring of which is optionally substituted, $R_1$ is an alkyl group having 1 to 4 carbon atoms, $R_2$ and $R_3$ independently from each other hydrogen, an alkyl group having from 1 to 4 carbon atoms or phenyl and Z is an alkylene chain $-(CH_2)_n$ where n is 1 to 4, the alkylene chain being optionally substituted.

Preferably $R_1$, $R_2$ and $R_3$ have the meanings set forth in the definitions of the corresponding substituents in the compound of the formula (1). This is also true for the optional substitution on the benzene ring of the benzothiazole or benzoselenazole ring and the optional substitution on the alkylene chain. Preferably Z is methylene.

According to another object of the present invention there is provided holographic material which comprises coated on a transparent base at least one silver halide Lippmann emulsion as just defined.

Conveniently there may be present in the coated silver halide Lippmann emulsion layer from 200 to 500 mg of dye of formula (2) per mol of silver halide. This provides optimum optical sensitization of the silver halide emulsion.

In contrast if the dye of FIG. 9 of BP No. 595,784 were used instead of the dye of formula (2) the maximum amount of dye which could be incorporated in the silver halide emulsion would be 50 mg per mol of silver halide which is insufficient to provide optimum optical sensitization.

In the holographic material of the present invention the silver halide crystals may have been chemically sensitized by any of the well known means for example by use of sulphur, selenium and noble metals. Examples of suitable sensitizing compounds are sodium thiosulphate and mercury, gold, palladium and platinum salts.

The silver halide of the Lippmann emulsion is preferably a predominantly bromide emulsion comprising at least 80% bromide by mole %. A particularly suitable emulsion comprises 96% by mole % bromide and 4% mole % of iodide.

The Lippmann emulsion may contain any of the additives commonly used in photographic emulsions for example wetting agents, stabilizing agents, polyethylene oxides, metal sequestering agents and growth or crystal habit modifying agents commonly used for silver halide such as adenine.

Preferably the dispersing medium is gelatin or a mixture of gelatin and a water-soluble latex for example a latex vinyl acrylate-containing polymer. Most preferably if such a latex is present in the final emulsion it is added after all crystal growth has occurred. However other water-soluble colloids for example casein, polyvinylpyrrolidone or polyvinyl alcohol may be used alone or together with gelatin.

The photographic base may be any of the transparent bases used for photographic film materials for example cellulose triacetate, cellulose acetate-butyrate, biaxially orientated polyethylene terephthalate, or a glass plate.

The following preparations show the preparation of some of the intermediates used in the Examples which follow.

PREPARATION A 2-((5,5-Dimethyl-3-(1-pyrrolidinyl)-2-cyclohexen-1-ylidene)-methyl)-3-methylbenzothiazolium iodide

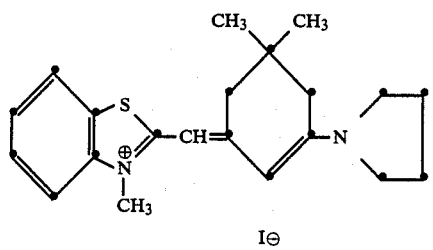

3-methyl-2-methylthiobenzothiazolium methylsulphate (353 g) was dissolved in warm ethanol (750 ml). To the stirred solution was added a solution of 1-(5,5-dimethyl-3-methylene-1-cyclohexen-1-yl)-pyrrolidine (242 g) in ethanol (250 ml), and the mixture was stirred and heated under reflux for 20 minutes.

A solution of sodium iodide (207 g) in water (140 ml) was added, and the mixture was stirred and cooled to room temperature. The solid was filtered off and washed successively with ethanol, water, ethanol and ether. After drying, the product was obtained as a deep red solid, m.p. 276°–278° C. (360 g).

PREPARATION B 5,5-Dimethyl-3-((3-methyl-2(3H)-benzothiazolylidene)-methyl-2-cyclohexen-1-one

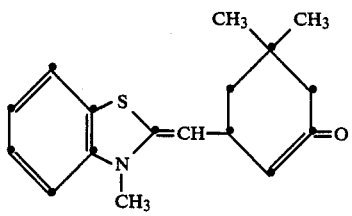

The product from A (360 g) was added to a solution of sodium hydroxide (62 g) in water (680 ml) and methanol (1020 ml), and the mixture was stirred and heated under reflux for 30 minutes. The resulting clear yellow solution was treated with water (2040 ml), and cooled to room temperature. The solid was filtered off and washed thoroughly with cold water. After drying in a vacuum oven at 50°, the product was obtained as an orange solid (187 g), m.p. 160°–164° C.

PREPARATION C 2-((3-Chloro-5,5-dimethyl-2-cyclohexen-1-ylidene)-methyl)-3-methylbenzothiazolium chloride

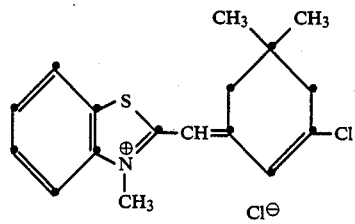

A solution of phosgene (72 g) in dry toluene (550 ml) was stirred and cooled whilst a solution of the product from B (187 g) in chloroform (600 ml) was run in over 30 minutes; the temperature was maintained at <20° during the addition. Pyridine (3.7 ml) was added, and the mixture was stirred and warmed continuously; evolution of gas, accompanied by considerable frothing occurred. Eventually the mixture was heated under reflux for three hours, then cooled in ice-water. Dry ether (900 ml) was added, the solid was filtered off and washed with more ether, and dried to constant weight in a vacuum oven at room temperature. The yield of deep yellow solid m.p. 202°–203° C. (decomp.) was 289 g.

PREPARATION D 2-((3-methoxy-5,5-dimethyl-2-cyclohexen-1-ylidene)-methyl)-3-methylbenzothiazolium methylsulphate

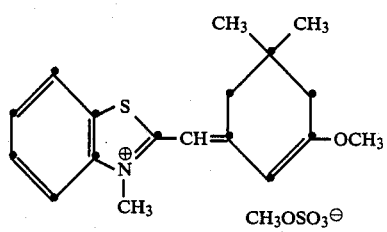

The product from A (231 g) was dissolved by stirring and warming in 1,1,1-trochloroethane (1450 ml) and dimethyl sulphate (92 ml) was run in over 25 minutes. Stirring and refluxing were continued for a further 2½ hours. The mixture was cooled and ether (800 ml) was stirred in. The solid was filtered off and washed well with ether; after drying in a vacuum oven, it was obtained as a yellow solid (324 g), m.p. 183°–185° C.

The following examples will serve to illustrate the invention.

EXAMPLE 1

5-(5,5-Dimethyl-3-((3-methyl-2(3H)-benzothiazolylidene)-methyl)-2-cyclohexen-1-ylidene)-4-oxo-2-thioxo-3-thiazolidineacetic acid

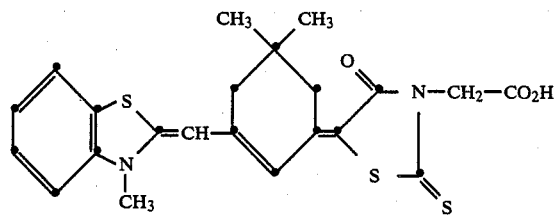

METHOD 1

A mixture of the chloro-intermediate (preparation C)(8.5 g), ethyl 4-oxo-2-thioxo-3-thiazolidineacetate (10.95 g), sodium bicarbonate (25.2 g) and ethanol (75 ml) was stirred and heated under reflux for 30 minutes.

The solid was filtered off and washed with ethanol until the washings were pure blue. It was then heated with water, filtered off and washed with hot water, finally again with a little ethanol.

The resulting solid (6.0 g) m.p. 213°–214° C., was refluxed for one hour with concentrated hydrochloric acid (60 ml), and the deep yellow solution was poured into cold water (500 ml). The precipitated solid was filtered off and washed thoroughly with cold water. It was purified by dissolving in hot methanol (100 ml) and triethylamine (10 ml) and treating the filtered solution with concentrated hydrochloric acid (10 ml). After cooling, the solid was filtered off and washed with methanol. The dye was obtained as a deep blue solid, m.p. 293°–294° C. (decomp.).

METHOD 2

2-((3-ethylthio-5,5-dimethyl-2-cyclohexen-1-ylidene)-methyl)-3-methylbenzothiazolium-p-toluenesulphonate was prepared by the method of BP 595785. A mixture of this compound (10.0 g), ethyl 4-oxo-2-thioxo-3-thiazolidineacetate (4.4 g), ethanol (50 ml), and triethylamine (8.0 ml) was refluxed for 30 minutes. After cooling, the solid was filtered off and washed with ethanol.

This product was refluxed with concentrated hydrochloric acid, and the dye was isolated by pouring the solution into water, as in method (1). The crude dye was purified by crystallizing from a mixture of chloroform and methanol, and had m.p. 292°–294° C. (decomp.).

The dye had a λ max. value (methanol), 605 nm; log E, 4.79.

EXAMPLE 2

α-Benzyl-5-(5,5-dimethyl-3-((3-methyl-2(3H)-benzothiazolylidene)-methyl)-2-cyclohexen-1-ylidene)-4-oxo-2-thioxo-3-thiazolidineacetic acid

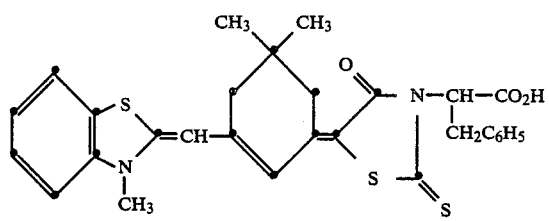

A mixture of the product from Preparation D (8.2 g), α-benzyl-4-oxo-2-thioxo-3-thiazolidineacetic acid (5.6 g), sodium bicarbonate (20 g), and ethanol (50 ml) was refluxed for 1 hour, then diluted with water (50 ml). Concentrated hydrochloric acid (30 ml) was stirred in gradually, and the mixture was warmed on the steambath for a few minutes, cooled, and diluted with more water (100 ml). The solid was filtered off and washed with water and was then heated with methanol (50 ml) triethylamine (2.0 ml) until all in solution.

The filtered solution was treated with concentrated hydrochloric acid (2.0 ml) and sufficient water to precipitate the dye, which was filtered off and washed with methanol.

The dye was obtained as a dark green solid, m.p. 173°–175° C.

By the use of methods similar to those described above, the dyes of the following Examples 3 to 7 were prepared.

EXAMPLE 3

5-(3-((5-chloro-3-methyl-2(3H)-benzothiazolylidene)-methyl)-5,5-dimethyl-2-cyclohexen-1-ylidene)-α-(2-methylpropyl)-4-oxo-2-thioxo-3-thiazolidineacetic acid

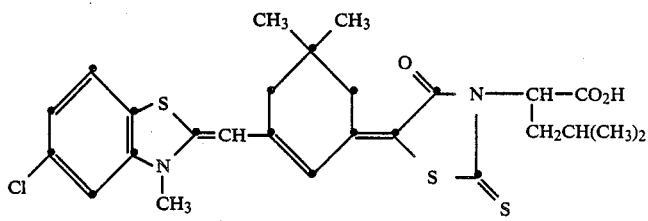

The dye was obtained as a deep green solid, m.p. 265°–267° C. (decomp.).

EXAMPLE 4

Not a dye according to the present invention but a dye which can be used in the holographic material of the present invention.

5-3-((3-Ethyl-2-(3H)-benzothiazolylidene)-methyl)-5,5-dimethyl-2-cyclohexen-1-ylidene)-4-oxo-2-thioxo-3-thiazolidineacetic acid

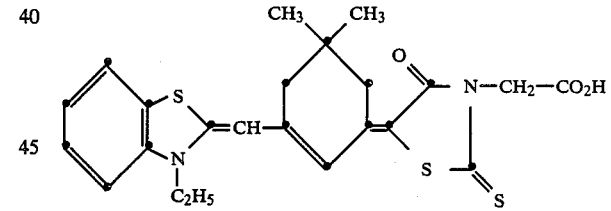

The dye was obtained as a deep green solid, m.p. 252°–253° C. (decomp.).

EXAMPLE 5

5-(5,5-Dimethyl-3-((3,5-dimethyl-2(3H)-benzothiazolylidene)-methyl)-2-cyclohexen-1-ylidene)-4-oxo-2-thioxo-3-thiazolidineacetic acid

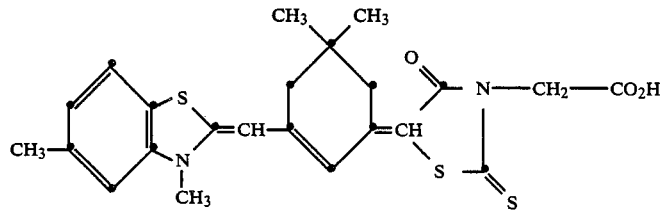

The dye was obtained as a deep green solid, m.p. 284°–285° C. (decomp.).

EXAMPLE 6

5-(5,5-Dimethyl-3-((3-methyl-2(3H)-benzo-selenazolylidene)-methyl-2-cyclohexen-1-ylidene)-4-oxo-2-thioxo-3-thiazolidine acetic acid

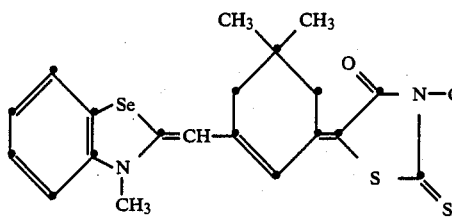

The dye was obtained a purple solid, m.p 278°–280° C. (decomp.).

EXAMPLE 7

5-(3-(5,6-Dimethoxy-3-methyl-2-(3H)-benzo-thiazolylidene)-methyl)-5-phenyl)-4-oxo-2-thioxo-3-thiazolidineacetic acid

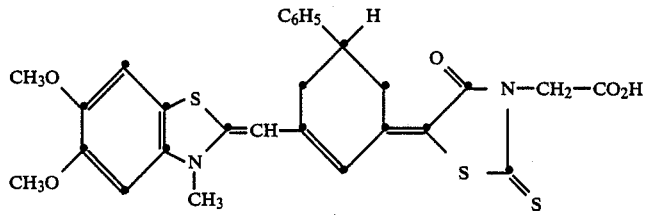

This was obtained as a deep blue solid, m.p. 275°–276° C. (decomp.).

EXAMPLE 8

Preparation of holographic material according to the present invention.

Holographic material was prepared by coating onto a transparent photographic film base composed of subbed polyester, a silver iodobromide Lippmann emulsion which comprised 96% mole % of silver bromide and 4% mole % silver iodide which had a mean crystal grain size of 0.04 μm at a silver coating weight of 30 mg/dm². The emulsion had been optically sensitized before coating with the red sensitizing dye of Example 1 at a rate of 0.4 g of dye per mol of silver in the emulsion.

This material was holographically exposed using a Denisyuk exposure method using a brushed aluminium plate as an object to yield (after processing) a reflection hologram. The laser used was a pulsed ruby laser which emits light at 694,3 nm.

The holographically exposed material was then processed using a silver halide developing agent followed by a solvent bleach as follows:

Development for 2 minutes in a solution of the following formulation:

| Sodium Sulphite | 30 g |
| Hydroquinone | 10 g |
| Sodium Carbonate | 60 g |
| Water to | 1000 ml |

The material was then transferred to an acidified dichromate bleach bath of the following composition:

| Potassium Dichromate | 4 g |
| Sulphuric Acid (conc.) | 4 g |
| Water to | 1000 g | until all silver metal had been bleached out which was about 2 minutes.

The sample was then washed in running water for 1 minute and dried.

Similar holographic material was prepared using the same amount of the dye of Examples 2 to 7 per mol of silver in the emulsion.

A comparative test was made using the sensitizing dye E of the formula

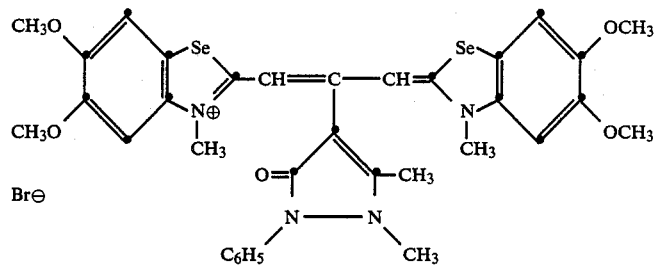

All these materials were processed as first set forth above.

A wedge spectrogram was prepared from a strip of each of the materials before holographic exposure and processing. From an examination of these strips the sensitivity range of each dye was noted and also the sensitivity maximum. The examination also showed if sufficient sensitivity had been imparted to the silver halide crystals. This gave an indication if sufficient dye had been adsorbed by the silver halide crystals and if there had been correct aggregation to provide minimum sensitivity in the required region of the spectrum.

The results of the wedge spectrogram examinations were as shown in the following table.

TABLE

| Dye | Sens. Range, [nm] | Sens. Max, [nm] | Sufficient Sensitivity Imparted |
|---|---|---|---|
| Ex-1 | 580–720 | 700 | Yes |
| Ex-2 | 570–720 | 680 | Yes |
| Ex-3 | 580–700 | 670 | Yes |
| Ex-4 | 590–720 | 700 | Yes |
| Ex-5 | 590–710 | 680 | Yes |
| Ex-6 | 590–710 | 690 | Yes |
| Ex-7 | 600–710 | 690 | Yes |
| Dye E | 570–720 | 695 | No |

The processed material was tested for the presence of a holographic image using a spectrophotometer with an integrating sphere using a tungsten filament light source which was passed through a monochromator before illuminating the processed material at the same angle as used in the holographic exposure. The resulting output trace shows the percentage reflection of the hologram compared with its wavelength. If a holographic image is present the resultant curve shows as a peak superimposed on a background of scattered light. If no appreciable peak is found there is no useful holographic image in the processed material. The integrating sphere is set-up so that specular reflection from the surface of the holographic film being tested is not recorded. The holographically exposed and processed material which contained dyes of Examples 1 to 7 and that which contained dye E were all tested as just set forth. Of the materials which contained dyes of Examples 1 to 7 in every case a very distinct peak was visible in the derived graph showing that a useful holographic image had been obtained.

However in the case of the material which contained dye E no appreciable peak was visible on the curve showing that no useful holographic image was present in the material.

I claim:

1. A Lippmann silver halide emulsion consisting essentially of optically sensitized silver halide grains in a dispersing medium, wherein the average grain size is from 0.02 to 0.2 μm and wherein the silver halide grains have been optically sensitized with a dye of the general formula

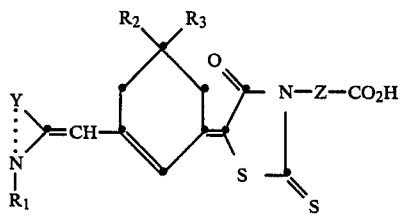

wherein Y completes a benzothiazole or benzoselenazole nucleus, the benzene ring of which is optionally substituted, $R_1$ is an alkyl group having 1 to 4 carbon atoms, $R_2$ and $R_3$ are independently from each other hydrogen, an alkyl group having from 1 to 4 carbon atoms or phenyl and Z is an alkylene chain $—(CH_2)_n$ where n is 1 to 4, the alkylene chain being optionally substituted.

2. A Lippmann silver halide emulsion according to claim 1 wherein $R_1$ is a methyl or ethyl group.

3. A Lippmann silver halide emulsion according to claim 1 wherein $R_2$ and $R_3$ are both methyl.

4. A Lippmann silver halide emulsion according to claim 1 wherein Z is methylene.

5. A Lippmann silver halide emulsion according to claim 1 wherein the silver halide of the emulsion comprises at least 80% by weight of silver bromide.

6. A process for the preparation of a hologram which comprises subjecting holographic material to a holographic exposure using a laser which emits in the red region of the spectrum and processing the holographic material to yield a hologram, said holographic material comprising a silver halide sensitized Lippmann emulsion layer consisting essentially of optically sensitized silver halide grains in a dispersing medium, the grain size of which is from 0.02 to 0.2 μm, where the silver halide grains have been sensitized to red light with a dye of the formula wherein Y completes a benzothiazole or benzoselenazole nucleus, the benzene ring of which is optionally substituted, $R_1$ is an alkyl group having 1 to 4 carbon atoms, $R_2$ and $R_3$ are independently from each other hydrogen, an alkyl group having from 1 to 4 carbon atoms or phenyl and Z is an alkylene chain $—(CH_2)_n$ where n is 1 to 4, the alkylene chain being optionally substituted.

7. Process for the preparation of a hologram of claim 6 wherein the dye is one in which $R_1$ is methyl or ethyl.

8. Process for the preparation of a hologram of claim 6 wherein the dye is one in which $R_2$ and $R_3$ are both methyl.

9. Process for the preparation of a hologram of claim 6 wherein the dye is one in which Z is methylene.

10. Process for the preparation of a hologram of claim 6 wherein the silver halide of the emulsion comprises at least 80% by weight of silver bromide.

11. A Lippmann silver halide emulsion according to claim 2 wherein the silver halide of the emulsion comprises at least 80% by weight of silver bromide.

12. A Lippmann silver halide emulsion according to claim 3 wherein the silver halide of the emulsion comprises at least 80% by weight of silver bromide.

13. A Lippmann silver halide emulsion according to claim 4 wherein the silver halide of the emulsion comprises at least 80% by weight of silver bromide.

* * * * *

UNITED STATES PATENT AND TRADEMARK OFFICE
CERTIFICATE OF CORRECTION

PATENT NO. : 4,804,599

DATED : February 14, 1989

INVENTOR(S) : Geoffrey E. FICKEN

It is certified that error appears in the above-identified patent and that said Letters Patent is hereby corrected as shown below:

In the heading of the Patent, item [73], change the address of the Assignee to --Basle, Switzerland--.

Signed and Sealed this

Twenty-first Day of November, 1989

*Attest:*

JEFFREY M. SAMUELS

*Attesting Officer*  *Acting Commissioner of Patents and Trademarks*